United States Patent [19]

Stiles

[11] 3,965,062

[45] June 22, 1976

[54] ETHYLENE/VINYL ACETATE/ISOBUTYLENE TERPOLYMER COATING COMPOSITION

[75] Inventor: Claude J. Stiles, Tuscola, Ill.

[73] Assignee: National Distillers and Chemical Corporation, New York, N.Y.

[22] Filed: Nov. 15, 1974

[21] Appl. No.: 524,177

Related U.S. Application Data

[63] Continuation of Ser. No. 288,211, Sept. 11, 1972, abandoned.

[52] U.S. Cl. .................. 260/28.5 AV; 427/207; 427/445; 526/331; 526/350
[51] Int. Cl.² .................................... C08J 3/20
[58] Field of Search ................... 427/207, 445; 260/28.5 AV, 79.8, 87.3, 80.78

[56] References Cited

UNITED STATES PATENTS

| 3,240,766 | 3/1966 | Thomson | 260/80.78 |
| 3,692,723 | 9/1972 | Kasagi et al. | 260/87.3 |

FOREIGN PATENTS OR APPLICATIONS

| 1,924,823 | 12/1969 | Germany |
| 702,703 | 10/1970 | Japan |

Primary Examiner—V. P. Hoke
Attorney, Agent, or Firm—Kenneth D. Tremain

[57] ABSTRACT

Ethylene/vinyl acetate/isobutylene terpolymers illustrating increased melt indices in combination with lower stiffness and Vicat softening temperatures are superior hot melt coating resins.

8 Claims, No Drawings

ETHYLENE/VINYL ACETATE/ISOBUTYLENE TERPOLYMER COATING COMPOSITION

This is a continuation of application Ser. No. 288,211 filed Sept. 11, 1972, now abandoned.

BACKGROUND OF THE INVENTION

1. Field of the Invention

This invention relates to ethylene/vinyl acetate/isobutylene (EVAI) terpolymers, methods of producing such terpolymers and their use in hot melt coating processes.

2. Description of the Prior Art

Saturated hydrocarbons such as cyclohexane, butane, propane, etc., have been used to increase the melt index of ethylene/vinyl acetate (EVA) copolymers. Such materials, however, simultaneously increase melt index and stiffness, the stiffness of the resins being increased to such an extent that it is difficult to process such resins in hot melt solutions.

U.S. Pat. No. 3,433,573 Holladay et al discloses forming polyblends containing from 5% to 95% by weight of an EVA copolymer and crystalline polymers obtained from 1-olefin monomers of from 3 to 8 carbon atoms, particularly polypropylene polymers. The EVA polymer contains from 5 to 35% vinyl acetate (VA). Materials such as polybutene-1 can be used in forming the polyblends. Blends having a broader stiffness range are obtained which provide low modulus rubbery products of excellent flexibility which can be used to manufacture transparent films for wrapping and packaging purposes.

U.S. Pat. No. 3,544,662 Polestak et al. discloses forming high melting point polymer compositions comprising a 3-methyl-1-butene polymer or copolymer where the copolymeric constituent can be 1-butene. No disclosure of EVA copolymers is set out.

References disclosing polymer compositions known to the art include U.S. Pat. Nos. 3,111,500 Bartl et al., 3,277,210 Mirabile et al.; 3,487,129 Platzer and 3,544,660 Thomas et al.

SUMMARY OF THE INVENTION

In the present invention isobutylene is used as a modifier for EVA copolymers. EVA with less than 28% VA cannot reach a melt index greater than 100 without a modifier being present. Many hot melt coating applications require an EVA copolymer with a melt index above 150, e.g., from 150 to 550 or higher. While some saturated hydrocarbon modifiers can increase melt indices to the desired melt index range of 150 to 550, they simultaneously increase crystallinity or stiffness of the EVA copolymers and make them unsatisfactory for hot melt coating applications.

It has been found that incorporating isobutylene into an EVA copolymer during the synthesis thereof to provide an EVAI terpolymer will increase the melt index of the product while reducing the stiffness and the Vicat softening temperature, thereby providing a resin superior for hot melt coating applications.

It is one object of the present invention to provide a novel terpolymer of EVAI.

It is a further object of the present invention to provide such a novel terpolymer illustrating an increased melt index in combination with reduced stiffness and Vicat softening temperature, which terpolymer is superior for hot melt coating applications.

DETAILED DESCRIPTION OF THE PREFERRED EMBODIMENTS OF THE INVENTION

In the following discussion, melt index is determined in accordance with ASTM D-1238, stiffness and modulus in accordance with ASTM D-747, D-638 and D-1043, Vicat softening temperature in accordance with ASTM D-1525 and tensile and elongation in accordance with ASTM D-683.

All percentages used in the present specification are weight percentages unless otherwise indicated. For the feed, basis is the total weight of reactants. For the terpolymer, total weight of terpolymer.

The EVAI terpolymers of the present invention are basically formed in accordance with known prior art techniques for the free radical catalytic formation of EVA copolymers at high temperature and high pressure. While batch, semi-continuous or continuous processes may be practiced, generally a high pressure autoclave resistant to the reactants with continuous flow is used. Any state of the art autoclave as is used in the prior art production of EVA copolymers can be used.

The preferred reaction conditions are: temperature of from about 360° to about 410°F.; pressure of from about 20,000 to about 30,000 psig; residence time of the reactants at reaction conditions of from about 25 to about 45 seconds.

The reactants may be fed into the autoclave either separately or they may be premixed and introduced as a combined feed stream. The elevated pressure required for the reaction is generally accomplished by injection of ethylene reactant using positive displacement, reciprocating compressors, though other state-of-the-art techniques may be used. Ancillary pumping and introduction equipment is in accordance with state-of-the-art apparatus as is used for the high temperature/pressure production of EVA. The free radical catalyst used to initiate the reaction of ethylene, vinyl acetate and isobutylene to provide the EVAI terpolymer may be introduced separately or carried into the autoclave in a feed stream.

The feed to the autocalve usually comprises purified ethylene, vinyl acetate, isobutylene and the free radical catalyst. Other materials may be present but they generally serve no significant purpose in the reaction, i.e., inert materials, traces of hydrocarbons and the like.

The percentage of vinyl acetate in the feed is approximately equal to the percentage of vinyl acetate desired in the final product, with usually 1–3% excess vinyl acetate being present to account for unavoidable process losses.

Generally, from about 0.5 to about 3% isobutylene is fed into the autoclave with the VA and ethylene. It has been found that this amount of isobutylene provides a final terpolymer illustrating characteristics required by most hot melt processors. There is no overly critical upper limit on the amount of isobutylene fed, but generally if amounts of isobutylene much less than about 0.5% are present in the feed the desired elevation of melt index and reduction is stiffness and Vicat softening temperature may be unacceptable. Incorporation of the isobutylene is substantially stoichiometric.

The balance of the essential reactive components in the feed to the system is ethylene. Since no significant advantages are obtained due to the presence of inert materials or other hydrocarbons being present, these will generally be kept to a minimum.

A free radical catalyst is introduced with the reactants. Any free radical catalyst or mixture thereof which is active at the temperature of reaction may be used, with representative free radical catalysts being tert-butyl perpivalate, diisopropyl peroxy dicarbonate, ditertiary perisobutyrate, etc. The amount of catalyst is in accordance with high temperature/high pressure prior art processes for forming EVA copolymers, and will generally be from about 0.01 to about 0.03% based on the total weight of reactants. Lesser amounts, though useful, somewhat lower process efficiency and greater amounts are economically impractical since often expensive catalyst removal techniques will then be required. As a general rule, the minimum amount of catalyst required will be used.

If desired, the catalyst can be introduced in a carrier, for instance, 10.0 wt. % catalyst in light kerosene may be added using a piston type positive displacement pump.

The process conditions used are always correlated with the final product characteristics desired. For on-line commercial processing, it is easiest to fix the ethylene and VA proportions and thereafter to vary the isobutylene percentages until (in accordance with an on-line analysis) the final product illustrates the desired melt index, stiffness, Vicat softening temperature, etc.

After the monomeric reactants are subjected to process conditions for the necessary amount of time, the solid polymeric product is removed via a pressure let-down valve to product recovery. Ethylene pressure suffices for removal. Unreacted ethylene, VA and isobutylene can be recycled, if desired, after flashing from the product.

After removal of residual catalyst impurities by standard art techniques, the product may thereafter be subjected to conventional processings, for example, granulation, blending with inorganic or organic pigments, antioxidants, etc., in a manner known to the art. Usually, however, the final user will blend pigments and the like and will prefer the EVAI product in substantially pure form for user blending just prior to hot melt coating.

The following examples are offered to illustrate the processing sequence of the present invention.

EXAMPLES

A standard high pressure autoclave resistant to the reactants was utilized. The reactants were introduced separately into the reactor as was the catalyst. Pressurization was obtained with ethylene added with reciprocating compressors. The reactants were fed at the following rate: In run 1, VA 24.3%, modifier 1.3%, catalyst 0.022% ethylene — the balance, about 74.3%; in run 2, VA 24.4%, modifier 2.2%, catalyst 0.021% ethylene — the balance about 73.3%. Within a processing sequence, the only variation within a run was the identity of the modifier.

Reaction for both runs was at 368°F. and 26,000 psig. The residence time in the autoclave was 38 seconds. After 38 seconds, the product was removed from the autoclave via a pressure let-down valve and unreacted feed components flashed and recycled. Butane was recycled to the reactor as it did not appear to physically enter into the EVA structure, i.e., but for a small amount of butane apparently physically entrained in the EVA copolymer, the balance of the butane was recycled to the reactor. Residual catalyst for these runs was negligible and was not removed. The products obtained in the (a) series of the runs using butane are compared to the products obtained in the (b) series of the runs using isobutylene below.

|  | Run 1 | | Run 2 | |
| --- | --- | --- | --- | --- |
|  | (a) | (b) | (a) | (b) |
| Modifier Used | Butane | Isobutylene | Butane | Isobutylene |
| Modifier content, % | 0 | 1.0 to 1.3% | 0 | 2.0 to 2.2% |
| Vinyl Acetate content, % | 19.2 | 20.4 | 18.0 | 19.9 |
| Ethylene content, % | balance | balance | balance | balance |
| Melt Index, g/10 min. | 151 | 141 | 447 | 550 |
| Density, gm/cc | 0.940 | 0.936 | 0.939 | 0.932 |
| Vicat Softening Temp. °C. | (51) | (48) | (46) | (36) |
| Torsional stiffness, psi | (5400) | — | (5770) | — |
| Modulus, psi (A stiffness measurement) | (4700) | (3900) | (5770) | (3400) |
| Tensile, psi | 810 | 680 | 580 | 490 |
| Elongation, % | 670 | 720 | 280 | 260 |

The modulus (a stiffness measurement) was 20 to 30 percent lower for the isobutylene modified resins than for the butane modified resins. The torsional stiffness values for these resins illustrated the same trend as the modulus values. The Vicat softening temperatures of the isobutylene modified resins was also lower than for the butane modified resins. The differences in stiffness (or modulus) and Vicat softening temperatures make the isobutylene modified copolymers more desirable for hot melt coating applications.

Similar runs with propylene substituted for isobutylene provided a hot melt solution which was extremely viscous and unacceptable for ease of processing.

Products of runs 1 (b) and 2 (b) were, after formation, subjected to hot melt coating. This was accomplished by melting wax (wax m.p. 145° to 155°F.) in a large container. Just prior to coating, the EVAI terpolymers were added to comprise 10 to 15% by wt. of the wax. The EVAI terpolymers easily dispersed throughout the wax to yield a wax/EVAI solution with very little effort. Coating was at 300°–400°F. and excellent product quality was obtained.

Certain preferred EVAI terpolymers which offer most superior results for hot melt coating applications are described below. These terpolymers contain no less than about 18% VA but less than about 28% VA and from about 0.5 to about 3% isobutylene, with the balance being ethylene. It is preferred that the EVAI terpolymers of the present invention do not contain less than about 18% VA for optimum hot melt coating properties. In fact, at VA concentrations of about 18%, the stiffness and adhesive properties of an EVAI terpolymer begin to suffer, and the properties of the terpolymer become less acceptable for hot melt coating operations as VA concentration decreases. However, though stiffness increases and adhesivity decreases below VA concentrations of about 18%, some users may desire such a terpolymer, and such is not excluded from the present invention.

These terpolymers illustrate a melt index of at least about 150 with most users requiring melt indices up to about 550 or higher. Such products preferably have a Vicat softening temperature of from 34° to 40°C. and a torsional stiffness of from 3,500 to 4,500 psi. A balance of these properties provides a resin most suitable for hot melt coating illustrating excellent melt index, stiffness and Vicat softening temperature.

From the above description, it will be apparent to one skilled in the art that the terpolymer of the present invention can also be blended with presently available hot melt coating resins to improve the properties thereof. In addition, minor proportions of other monomers can, if desired, be polymerized into the system of the present invention to form a four or greater component polymer, e.g., lower olefins such as polypropylene, other lower vinyl esters which are homologues of vinyl acetate etc. This will rarely be done, however, because of system complexity and the fact that such components are not necessary to obtain a well balanced material for hot melt coating application. If present, such other components would be used in minor proportions. Reaction conditions such as those heretofore recited could be used.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. In a hot melt coating process, the improvement which comprises using a coating containing a terpolymer of ethylene, about 18–28 weight percent vinyl acetate and about 0.5–3 weight percent isobutylene, said terpolymer having a melt index of at least about 150.

2. The process of claim 1 wherein said terpolymer has a melt index up to about 550.

3. The process of claim 2 wherein said terpolymer has a Vicat softening temperature of 34°–40° C. and a torsional stiffness of 3500–4500 psi.

4. The process of claim 1 wherein said terpolymer has a Vicat softening temperature of 34°–40° C. and a torsional stiffness of 3500–4500 psi.

5. In a hot melt coating composition comprising wax and an additive, the improvement which comprises employing a terpolymer of ethylene, about 18–28 weight percent vinyl acetate, and about 0.5–3 weight percent isobutylene having a melt index of at least about 150 as said additive.

6. The composition of claim 5 wherein said terpolymer has a melt index of up to about 550.

7. The composition of claim 6 wherein said terpolymer has a Vicat softening temperature of 34°–40° C. and a torsional stiffness of 3500–4500 psi.

8. The composition of claim 5 wherein said terpolymer is employed in an amount of 10–15 percent by weight of the wax.

* * * * *